US012714643B2

(12) United States Patent
Macpherson

(10) Patent No.: US 12,714,643 B2
(45) Date of Patent: Aug. 25, 2026

(54) NEEDLE ASSEMBLIES

(71) Applicant: Red Coral Acupuncture Supplies Pty Ltd, Melbourne (AU)

(72) Inventor: Karl Anderson Macpherson, Melbourne (AU)

(73) Assignee: Red Coral Acupuncture Supplies Pty Ltd, Melbourne (AU)

( * ) Notice: Subject to any disclaimer, the term of this patent is extended or adjusted under 35 U.S.C. 154(b) by 0 days.

(21) Appl. No.: 18/425,609

(22) Filed: Jan. 29, 2024

(65) Prior Publication Data

US 2024/0164985 A1 May 23, 2024

Related U.S. Application Data

(63) Continuation of application No. 17/872,695, filed on Jul. 25, 2022, now abandoned, which is a continuation of application No. 16/993,932, filed on Aug. 14, 2020, now abandoned.

(60) Provisional application No. 62/886,693, filed on Aug. 14, 2019.

(51) Int. Cl.
*A61H 39/08* (2006.01)

(52) U.S. Cl.
CPC ......... *A61H 39/083* (2013.01); *A61H 39/086* (2013.01)

(58) Field of Classification Search
CPC ..... A61H 39/08; A61H 39/083; A61H 39/086
See application file for complete search history.

(56) References Cited

U.S. PATENT DOCUMENTS

| | | | | |
|---|---|---|---|---|
| 3,861,392 | A * | 1/1975 | Moen | A61H 39/08 606/189 |
| 4,907,590 | A | 3/1990 | Wang et al. | |
| 4,950,279 | A | 8/1990 | Chang | |
| 8,167,900 | B2 | 5/2012 | Teichert et al. | |
| 8,328,838 | B2 | 12/2012 | Lee | |
| 2005/0267507 | A1 | 12/2005 | Kao | |
| 2021/0045970 | A1 | 2/2021 | Macpherson | |
| 2022/0354742 | A1 | 11/2022 | Macpherson | |

* cited by examiner

*Primary Examiner* — Todd J Scherbel
(74) *Attorney, Agent, or Firm* — Howard & Howard Attorneys PLLC

(57) ABSTRACT

A needle assembly includes a needle with the needle having a handle at a proximal end portion thereof. The assembly also includes a guide tube sized to house the needle and handle, with the guide tube including an inwardly-extending projection adjacent a proximal end thereof. The inwardly-extending projection is configured to engage an engagement portion of the handle for retaining the needle within the guide tube such that a distal tip of the needle is positioned within the guide tube and a proximal end portion of the handle extends from the proximal end of the guide tube. The engagement being releasable upon a force applied to the proximal end portion of the handle to extend the distal tip of the needle out of the guide tube.

15 Claims, 5 Drawing Sheets

NEEDLE ASSEMBLIES

CROSS REFERENCE TO RELATED APPLICATIONS

This application is a Continuation of U.S. patent application Ser. No. 17/872,695 filed on Jul. 25, 2022, which is a Continuation of U.S. patent Application Ser. No. 16/993,932 filed on Aug. 14, 2020, which claims priority to and all the benefits of U.S. Provisional Application No. 62/886,693 filed on Aug. 14, 2019, the disclosures of which are expressly incorporated by reference in their entirety.

FIELD OF THE INVENTION

The invention relates to needle assemblies for acupuncture and dry needling.

BACKGROUND OF THE INVENTION

Conventional needle assemblies for use in acupuncture and dry needling typically comprise a guide tube and a needle located within the guide tube. The needle has a handle which is secured via adhesive to the inside of the guide tube, to thereby retain the needle (specifically, the distal tip of the needle) within the guide tube. In use, the practitioner applies the distal end of the guide tube to the patient's skin (aligned with an acupuncture point or a pressure point), and applies a force to the proximal end of the handle, eg by tapping, to disengage the needle from the guide tube, resulting in the distal tip of the needle penetrating the patient's skin.

However, the adhesive attaching the handle to the guide tube is conventionally single-use and loses its function once the handle has been separated from the guide tube. Therefore, if the needle is inadvertently dislodged from the guide tube during packing, transport or storage, it cannot be used (due to hygiene reasons) and has to be discarded.

Further, there is also a challenge during manufacturing of conventional needle assemblies of applying a consistent amount of adhesive to each needle. A consistent predetermined amount is important, since excessive adhesive affects the ease with which the practitioner dislodges the needle from the guide tube, while insufficient adhesive results in a larger number of needles being inadvertently dislodged during transit or in storage. In this context, there is a need for improved needle assemblies.

SUMMARY OF THE INVENTION

According to an aspect of the present invention, there is provided a needle assembly comprising:

- a needle having a handle at a proximal end portion thereof; and
- a guide tube sized to house the needle and handle, the guide tube comprising an inwardly-extending projection adjacent a proximal end thereof, said inwardly-extending projection being configured to engage an engagement portion of the handle for retaining the needle within the guide tube such that a distal tip of the needle is positioned within the guide tube and a proximal end portion of the handle extends from the proximal end of the guide tube;
- said engagement being releasable upon a force applied to a proximal end of the handle to extend the distal tip of the needle out of the guide tube.

The handle may be secured to the proximal end portion of the needle.

The engagement portion of the handle may comprise a textured anti-slip surface.

The engagement portion of the handle may be etched to define the textured anti-slip surface.

The engagement portion of the handle may be located intermediate distal and proximal end portions of the handle.

The guide tube may be manufactured of a translucent polymer.

The needle and handle may each be manufactured of a metallic material.

The needle may be manufactured of a stainless steel and the handle may be manufactured of aluminum or an aluminum alloy.

In the engaged configuration, a distance between the inwardly-extending projection and a proximal end of the handle may be between about 5 mm and 8 mm.

A diameter of the handle may be between about 2 mm and 2.5 mm.

One or both of the proximal end portion and the distal end portion of the handle may comprise at least one indent for securing the needle to the handle.

Following release of said engagement due to said force being applied to the handle, said engagement may be reinstatable by repositioning the needle such that the inwardly-extending projection re-engages the engagement portion.

In a further aspect, the present invention provides a method of assembling a needle assembly described above, the method comprising:

- inserting the proximal end portion of the needle into a central bore of the handle; and
- inserting the needle and handle combination into the guide tube,
- the handle being positioned such that the engagement portion of the handle engages the inwardly-extending projection of the guide tube.

A diameter of the central bore of the handle may be between about 0.5 to 1 time the diameter of the proximal end portion of the needle such that the needle is secured in the handle via interference fit.

The method may further comprise providing a plurality of bends in the proximal end portion of the needle prior to inserting the proximal end portion of the needle into the central bore of the handle.

The method may further comprise pressing the proximal and/or distal end portion(s) of the handle onto the needle to form said at least one indent for securing the needle to the handle.

The inwardly-extending projection may be pressed into the guide tube to engage said engagement portion of the handle.

DESCRIPTION OF THE DRAWINGS

The invention will now be described, by way of non-limiting example only, with reference to the accompanying drawings, in which.

DETAILED DESCRIPTION

Figure 1:
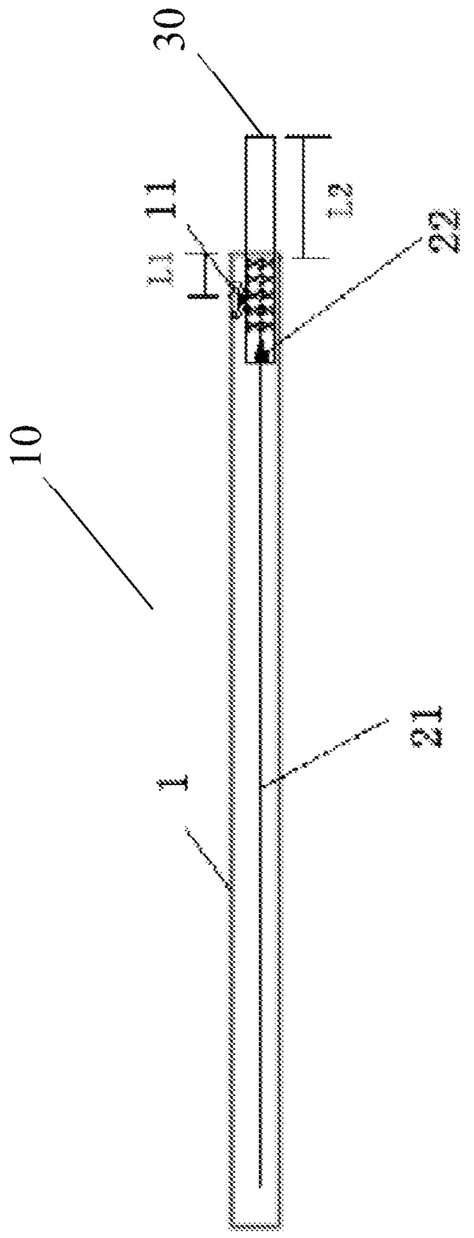
FIG. 1 is a schematic illustration of a needle assembly according to one embodiment.
Figure 3:
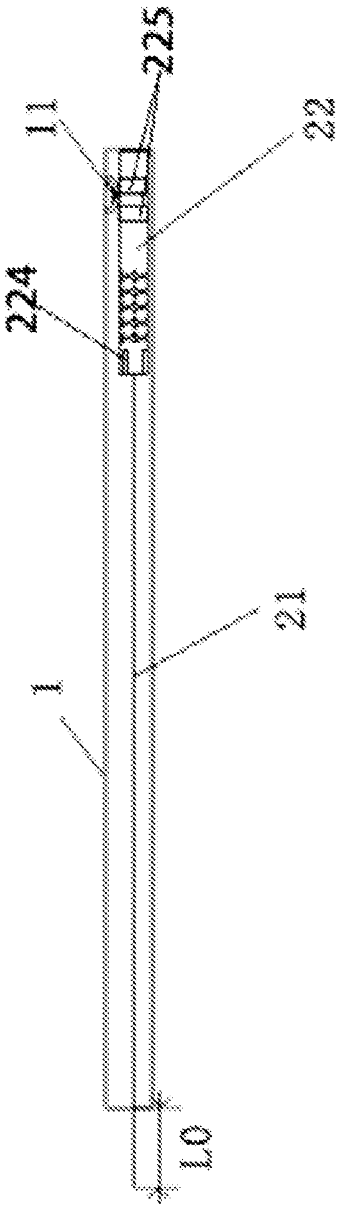
FIG. 3 illustrates the needle assembly with needle extended.

FIG. 1 illustrates a needle assembly 10 according to an embodiment of the present invention. The needle assembly 10 comprises a needle 21 having a handle 22 secured to a proximal end portion of the needle 21 and a guide tube 1 sized to house the needle and handle combination 2. The guide tube 1 comprises an inwardly-extending projection 11 adjacent a proximal end of the guide tube 1. The inwardly-extending projection 11 is configured to engage an engagement portion 222 of the handle, for retaining the needle 21 within the guide tube 1 such that a distal tip of the needle 21 is positioned within the guide tube 1 and a proximal end portion of the handle 22 extends from the proximal end of the guide tube 1. This engaged configuration is illustrated in FIG. 1. The engagement is releasable upon a force applied to a proximal end of the handle 22 to extend the distal tip of the needle 21 out of the guide tube 1. This released configuration is illustrated in FIG. 3.

The inwardly-extending projection preferably extends inwardly to such an extent that when engaged with the engagement portion 222 of the handle, the opposite face of the handle abuts the internal wall of the guide tube 1.

The engagement portion 222 of the handle 22 comprises a textured anti-slip surface. The roughness of the textured surface increases the coefficient of friction between the engagement portion 222 and the inwardly-extending projection 11, resulting in a more secure engagement of the two components in the engaged state. In a preferred embodiment, the engagement portion 222 of the handle 22 is etched to define the textured anti-slip surface. Alternatively, the textured anti-slip surface may be formed by other methods, eg by cutting grooves, corrugations, notches, etc, into the engagement portion 222 of the handle 2.

In yet other embodiments, the engagement portion 222 may comprise additional or alternative surface modifications or finishes to increase the coefficient of friction between the engagement portion 222 and the inwardly-extending projection 11, eg applying a tacky material to the engagement portion 222, adding ribs, embossing, etc.

In contrast with prior art needle assemblies, the engagement between guide tube 1 and the needle 22 is not via adhesive. As discussed above, a problem with the prior art adhesive engagement is that once disengaged, the needle cannot be securely repositioned in the engaged configuration. In comparison with such prior art assemblies, the needle assembly according to embodiments of the present invention is repositionable. That is, following release of engagement between the inwardly-extending projection 11 and the engagement portion 222, the engagement is reinstatable by repositioning the needle such that the inwardly-extending projection 11 re-engages the engagement portion 222. Therefore, if the needle 21 is inadvertently dislodged from its engaged position during packing, transit or storage, it may be repositioned within the guide tube 1 into the engaged/ready-to-use configuration, provided there has been no contamination of the distal tip of the needle.

In the engaged configuration, the distance between the inwardly-extending projection 11 and the proximal end 30 of the handle (ie the distance L1 plus L2) is between about 5 mm and 8 mm. In the released configuration, the extension of the distal tip of the needle from the distal end of the guide tube (ie the distance L0) is between about 5 mm and 8 mm.

The handle 22 may be circular in cross-section, with a diameter of the handle 22 between about 2 mm and 2.5 mm. It is envisaged that such a diameter facilitates handling of the needle.

Figure 2:
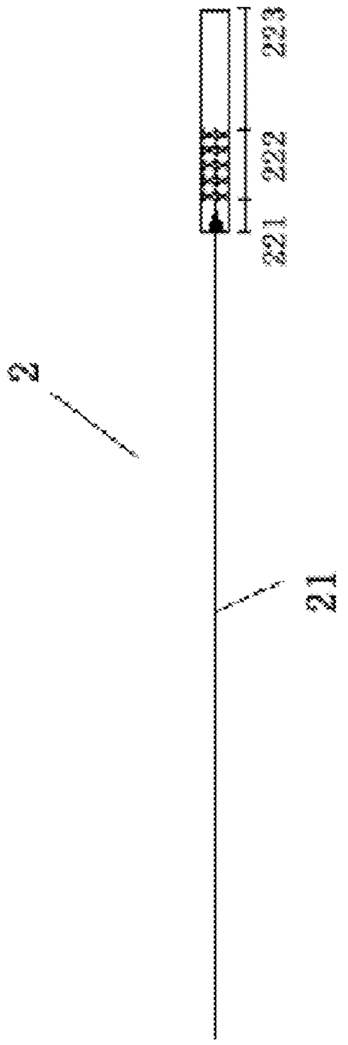
FIG. 2 is a schematic illustration of a needle of the needle assembly.

As illustrated most clearly in FIG. 2, the engagement portion 222 of the handle is located intermediate distal 221 and proximal 223 end portions of the handle 22. One or both of the proximal end portion 221 and the distal end portion 223 of the handle may comprise at least one inwardly-extending projection or indent for securing the needle 21 to the handle 22. For example, three inwardly-extending projections 224, spaced around the circumference of the handle may be formed in the distal end portion 221 to secure the needle 21 in the handle 22. Additionally or alternatively, two indents 225 may be provided, axially spaced from each other, in the proximal end portion 223 of the handle to secure the needle 21 in the handle 22.

Figure 4:
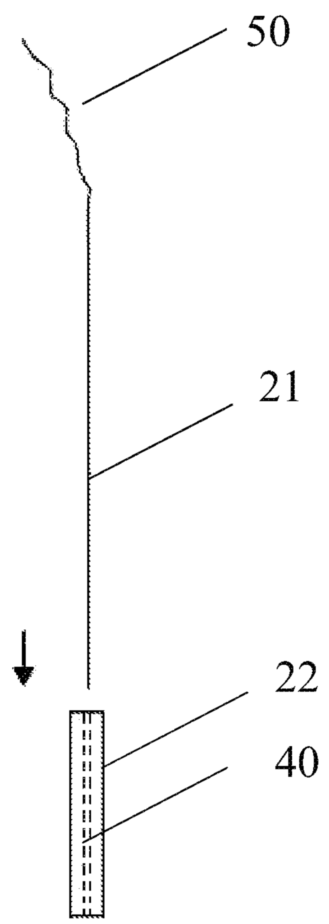
FIG. 4 is a schematic illustration of the needle and handle of the needle in a pre-assembled state.
Figure 5:
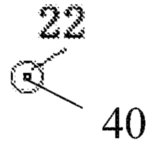
FIG. 5 is a cross-sectional view of the handle of the needle.

Additionally or alternatively, the needle is secured within the handle via interference fit. With reference to FIGS. 4 and 5, the handle 22 comprises a central axially-extending bore 40 configured to receive the proximal end portion of the needle 21. The diameter of the central bore may be between about 0.5 to one time the diameter of the proximal end portion of the needle, such that the needle, once inserted into the handle, is fixed therein via friction/interference fit.

Additionally or alternatively, the proximal end portion of the needle may be provided with a plurality of kinks or bends 50 such that the proximal end portion diverges from linear. When the needle is forced into the linear bore 40 of the handle, the bent portion of the needle is forced into a linear configuration that is resisted by the elasticity of the needle, which helps to secure the needle in the handle.

The guide tube 1 is preferably manufactured of a transparent or translucent polymer. In a preferred embodiment, the guide tube is formed by injection molding. Alternative processing methods may also be suitable, such as plastics extrusion. The proximal and distal ends of the guide tube 1 preferably comprise smooth surfaces to prevent scratching of the skin in use.

The needle 21 is preferably manufactured of a metallic material, for flexibility of the needle and ease of sterilisation. For example, the needle may be manufactured of a stainless steel.

The handle 22 is preferably manufactured of a metallic material, for example, aluminum or an aluminum alloy.

The present invention also relates to methods of making and assembling needle assembly 10.

In one embodiment, the assembly method comprises inserting the proximal end portion of the needle 21 into the central bore 40 of the handle 22, inserting the needle and handle combination 2 into the guide tube 1, the handle being positioned such that the engagement portion 222 of the handle engages the inwardly-extending projection 11 of the guide tube.

In one example, prior to insertion of the needle 21 into the handle 22, the proximal end portion of the needle is crimped or otherwise shaped to form the plurality of kinks/bends 50. The needle 21 is then pulled through the bore 40 of the handle 22 such that the kinks/bends 50 are positioned within the handle 22. In some embodiments, the diameter of the bore 40 is less than the diameter of the proximal end portion of the needle, so that the needle is secured within the handle via interference fit. The distal end of the needle may then be sharpened to a suitable tip. In other examples, the sharp distal tip of the needle is formed prior to insertion of the needle into the handle.

In some embodiments, once the needle 21 has been inserted into the handle 22, the proximal end portion 221 and/or the distal end portion 223 is/are pressed to form the projection(s) 224 and/or indent(s) 225 that help to secure the needle to the handle.

The engagement portion 222 of the handle is preferably formed, eg via etching as discussed above, before the needle 21 is inserted into the handle, to reduce the risk of contaminating the distal tip of the needle during such processing. However, the engagement portion 222 could conceivably alternatively be formed on the handle portion during or after insertion of the needle into the handle.

In one embodiment, the inwardly-extending projection 11 is formed after the needle and handle combination 2 has been inserted into the guide tube 1. For example, the proximal end portion of the guide tube 1 may be crimped, pressed or stamped to form the inwardly-extending projection 11.

Figure 6:
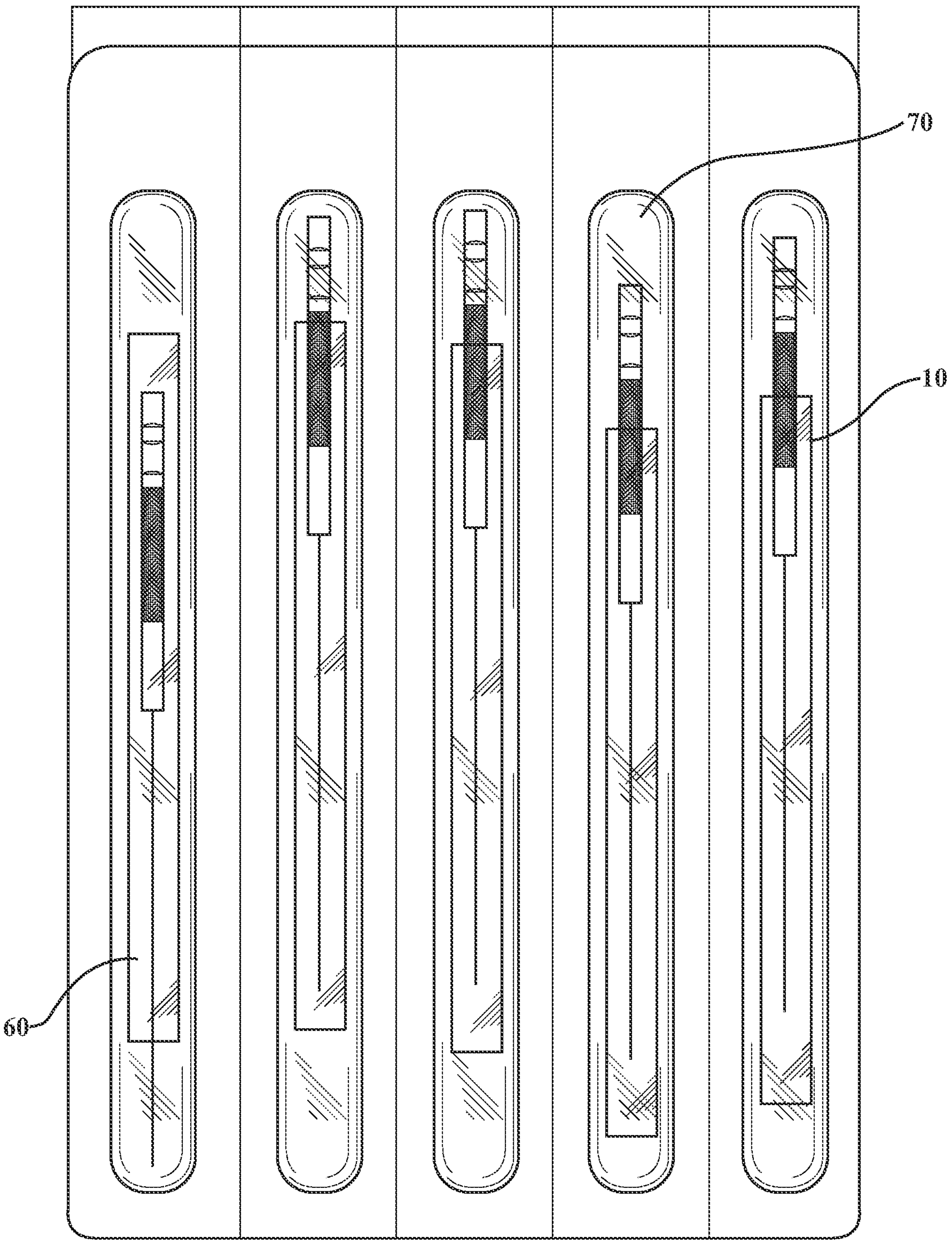
FIG. 6 illustrates packaged needle assemblies according to one embodiment.

The needle assembly 10 may be packaged for distribution, eg in sterile blister packs 70 as illustrated in FIG. 6. The engagement between the inwardly-extending projection 11 and the engagement portion 222 of the handle is typically sufficient to retain the distal tip of the needle hygienically within the guide tube until the user/practitioner is ready to use the needle assembly 10. However, in the unlikely event that the needle 21 is dislodged out of the guide tube 1 during transit or storage of the packaged needle assemblies, for example as indicated by reference 60 in FIG. 6, the practitioner may, prior to use, carefully reinsert the needle into the guide tube, re-establishing the engagement between the inwardly-extending projection 11 and the engagement portion 222 of the handle, as long as the distal tip of the needle has not been touched/contaminated. Accordingly, the reinstatable nature of needle assembly 10 reduces wastage.

To use the needle, the practitioner removes the needle assembly 10 from the packaging, applies the distal end of the guide tube 1 to the patient's skin, and applies a force on the proximal end of the handle 22 (eg by tapping) to insert the needle into the patient's skin. Once the engagement between the inwardly-extending projection 11 and the engagement portion 222 has been released (by the force applied to the proximal end of the handle 22), the needle slides smoothly along the guide tube to extend out of the distal end thereof (ie there are no further disruptions to the movement of the needle within the guide tube).

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A needle assembly comprising:

a needle;

a handle at a proximal end portion of the needle, the handle having a proximal end and a distal end and being of a substantially constant circular cross-section along its entire length between the proximal end of the handle and the distal end of the handle; and a guide tube sized to house the needle and the handle, the guide tube comprising an inwardly-extending projection adjacent a proximal end of the guide tube;

the needle assembly being repositionable between a released configuration and an engaged configuration;

wherein, in the engaged configuration, the inwardly-extending projection engages an engagement portion of the handle to retain the needle within the guide tube such that a distal tip of the needle is positioned within the guide tube and the proximal end of the handle extends from the proximal end of the guide tube;

wherein the needle assembly is releasable from the engaged configuration to the released configuration upon a distal force applied to the proximal end of the handle that disengages the engagement portion from the inwardly-extending projection and allows the needle to move distally along the guide tube without further disruption to extend the distal tip of the needle out of the guide tube.

2. The needle assembly of claim 1, wherein the handle is secured to the proximal end portion of the needle.

3. The needle assembly of claim 2, wherein the engagement portion of the handle comprises a textured anti-slip surface and is located intermediate the distal end of the handle and the proximal end of the handle.

4. The needle assembly of claim 3, wherein the guide tube comprises a translucent polymer, the needle comprises stainless steel, and the handle comprises aluminum or an aluminum alloy.

5. The needle assembly of claim 1, wherein the engagement portion of the handle comprises a textured anti-slip surface.

6. The needle assembly of claim 5, wherein the engagement portion of the handle is etched to define the textured anti-slip surface.

7. The needle assembly of claim 1, wherein the engagement portion of the handle is located intermediate the distal end of the handle and the proximal end of the handle.

8. The needle assembly of claim 7, wherein the needle and the handle are metallic.

9. The needle assembly of claim 8, wherein the needle is manufactured of a stainless steel and the handle is manufactured of aluminum or an aluminum alloy.

10. The needle assembly of claim 1, wherein the guide tube is manufactured of a translucent polymer.

11. The needle assembly of claim 1, wherein, in the engaged configuration, a distance between the inwardly-extending projection and a proximal end of the handle is between about 5 mm and 8 mm.

12. The needle assembly of claim 11, wherein a diameter of the handle is between about 2 mm and 2.5 mm.

13. The needle assembly of claim 1, wherein a diameter of the handle is between about 2 mm and 2.5 mm.

14. The needle assembly of claim 1, wherein the inwardly-extending projection extends inwardly to such extent that when engaged with the handle, an opposite face of the handle abuts an internal wall of the guide tube.

15. A needle assembly comprising:

a needle;

a handle secured at a proximal end portion of the needle, the handle having a proximal end and a distal end and being of a substantially constant circular cross-section along its entire length between the proximal end of the handle and the distal end of the handle; and a guide tube formed from a translucent polymer and sized to house the needle and the handle, the guide tube comprising an inwardly-extending projection adjacent a proximal end of the guide tube;

the needle assembly being repositionable between a released configuration and an engaged configuration;

wherein, in the engaged configuration, the inwardly-extending projection engages an engagement portion of the handle to retain the needle within the guide tube such that a distal tip of the needle is positioned within the guide tube and the proximal end of the handle extends from the proximal end of the guide tube;

wherein the needle assembly is releasable from the engaged configuration to the released configuration upon a distal force applied to the proximal end of the handle that disengages the engagement portion from the inwardly-extending projection and allows the needle to move distally along the guide tube without further disruption to extend the distal tip of the needle out of the guide tube, and wherein the engagement portion of the handle comprises a textured anti-slip surface etched into the handle; and wherein the engagement portion of the handle is located intermediate the distal end of the handle and the proximal end of the handle.

* * * * *